(12) United States Patent
Ogawa (10) Patent No.: US 6,256,286 B1
(45) Date of Patent: Jul. 3, 2001

(54) METHOD FOR INITIATING A PHASE CHANGE RECORDING MEDIUM

(75) Inventor: Masatsugu Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/024,296

(22) Filed: Feb. 17, 1998

(30) Foreign Application Priority Data

Feb. 21, 1997 (JP) .................................................... 9-038239

(51) Int. Cl.⁷ ........................................................ G11B 7/00
(52) U.S. Cl. .............................................................. 369/116
(58) Field of Search ............................. 369/116, 13, 100, 369/59, 283, 275.1, 275.3, 284, 121

(56) References Cited

U.S. PATENT DOCUMENTS

| 5,709,978 | * | 1/1998 | Hirotsune et al. | 369/121 |
| 5,846,625 | * | 12/1998 | Terao et al. | 369/283 |
| 5,958,649 | * | 9/1999 | Hirotsune et al. | 369/284 |

FOREIGN PATENT DOCUMENTS

| 63-261537 | 10/1988 | (JP) . |
| 64-4935 | 1/1989 | (JP) . |
| 1-86339 | 3/1989 | (JP) . |
| 4-102227 | 4/1992 | (JP) . |
| 4-102228 | 4/1992 | (JP) . |
| 4-113519 | 4/1992 | (JP) . |
| 4-186530 | 7/1992 | (JP) . |
| 4-209317 | 7/1992 | (JP) . |
| 4-219623 | 8/1992 | (JP) . |
| 4-366424 | 12/1992 | (JP) . |
| 7-161038 | 6/1995 | (JP) . |
| 7-192266 | 7/1995 | (JP) . |
| 8-83443 | 3/1996 | (JP) . |
| 8-153343 | 6/1996 | (JP) . |
| 8-221814 | 8/1996 | (JP) . |
| 9-35267 | 2/1997 | (JP) . |

OTHER PUBLICATIONS

Korean Office Action, dated Jun. 30, 2000, with English language translation of Korean Examiner's comments.

* cited by examiner

Primary Examiner—Thang V. Tran
(74) Attorney, Agent, or Firm—McGuireWoods, LLP (57) ABSTRACT

In a method for initializing an information recording surface of a phase change recording medium by radiating laser light onto the information recording surface, the laser light power is set to a first power which is in the condition of power around at which crystallization of the information recording surface is about to occur, this laser light being repeatedly radiated onto the part that is to be initialized.

13 Claims, 7 Drawing Sheets

METHOD FOR INITIATING A PHASE CHANGE RECORDING MEDIUM

BACKGROUND OF THE INVENTION

1. Field of the Invention

The present invention relates to a method for initializing a phase change recording medium, and more specifically to a method for initializing a phase change recording medium whereby laser light is radiated onto an information recording surface to cause crystallization thereof.

2. Description of Related Art

A phase change recording medium is an optical recording medium which uses a material capable of supporting reversible crystalline and amorphous (non-crystalline) states as a recording film, the difference in reflectivity between the crystalline and amorphous states being detected as a signal.

In general, a chalcogenide material such as GeSbTe, InSbTe, InSe, InTe, AsTeGe, TeOx-GeSn, TeSeSn, SbSeBi, BiSeGe, AgInSbTe, or the like is used as the phase change recording material, and when these materials are formed as a film over a substrate, immediately after formation they are entirely amorphous.

The state immediately after film formation is generally an unstable amorphous state having a low reflectivity that makes servo pull-in difficult. Because of this, a process known as initialization must be performed to convert the entire recording film to the crystalline state. This initialization process is extremely important in establishing the phase change recording characteristics, the subsequent phase change recording characteristics greatly changing depending upon the method of initialization.

Initialization in the past has used the fusion method, which is disclosed in the Japanese Unexamined Patent Publication H4-366424 and Japanese Unexamined Patent Application Publication H4-209317. This initialization method is that of raising the temperature until the phase change recording film melts, causing it to crystallize. In the case of this method, because the recording film is formed at one time, in the same manner as occurs in the actual recording and erasing processes, the recording and playback characteristics are stable after the initialization. This initialization process uses an optical head that is very similar to the normal optical head, and is performed with a laser beam of a size on the order of several micrometers.

One problem with the above-noted initialization process is the time that it requires. In the case of the initialization of an overwritable magneto-optical disk, since a strong magnetic field is merely applied over the entire surface, the time required is approximately 5 seconds. In the case of a phase changed disk, however, the above-noted method requires several hours.

Because of the above-noted problem, approaches to shortening the initialization time are disclosed in the Japanese Unexamined Patent Publication H8-221814 and Japanese Unexamined Patent Publication H8-153343, although these are not necessarily successful in achieving good initialization.

In contrast to the above, in the Japanese Unexamined Patent Publication H7-192266, there is disclosure of an attempt to perform high-speed initialization using a laser beam having an elliptical beam with its major axis in the radial direction of the disk. In the case of this high-speed initialization, initialization is done by the fusing method.

Figure 8:
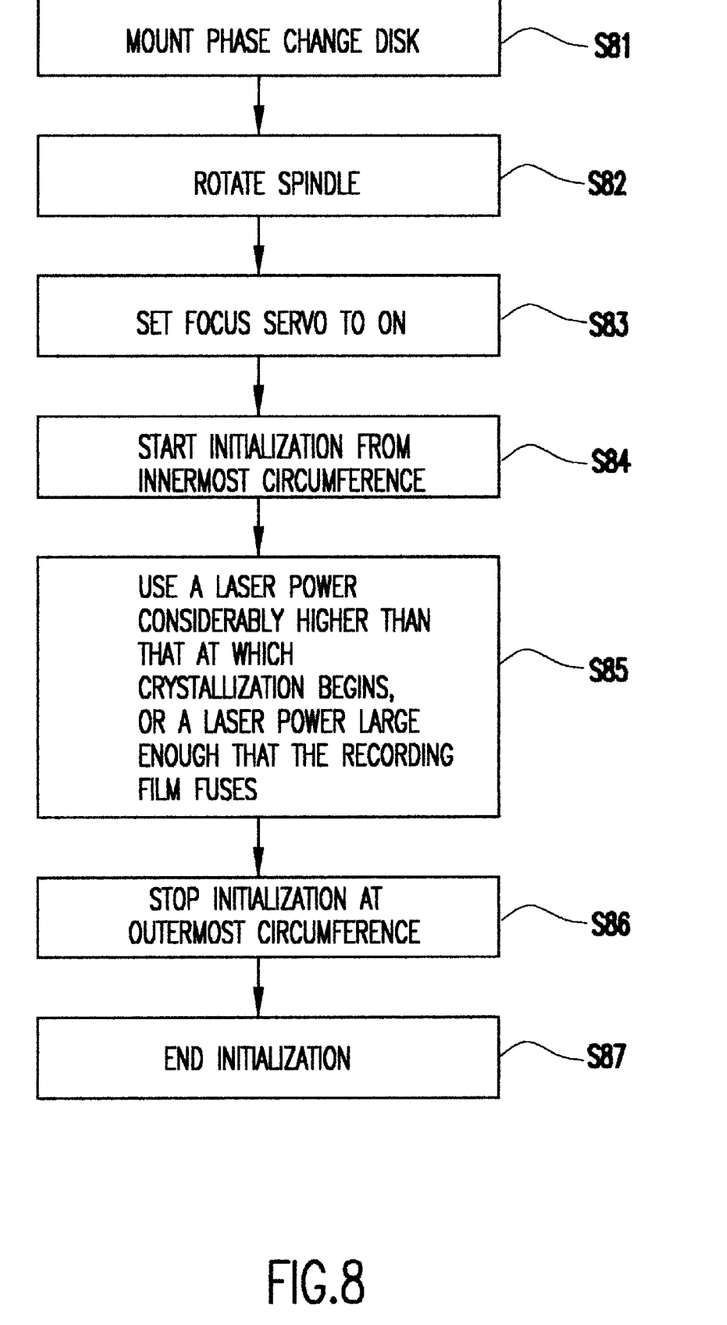
FIG. 8 is a flowchart which shows the initialization method of the past.

FIG. 8 is a flowchart showing the fusion method of initialization.

First, the phase change disk is mounted to the spindle (step S81), and the rotation of the spindle is started (step S82). Then, the focus servo is set to on (step S83), and the initialization of the disk is started from the innermost circumference (step S84). During the initialization, the laser power is set to a power which is considerably larger than the power at which crystallization begins, that is, to a power sufficient to fuse the recording film (S85). The initialization operation is stopped at the outermost circumference of the disk (step S86) at which point the initialization ends (step S87).

However, while initialization using a laser beam that is elliptical with the major axis thereof aligned in the radial direction of the disk is suited for high-speed initialization, the laser beam power distribution in the radial direction is not uniform, this leading to the problem of unevenness in initialization. That is, it was not possible to discover a method capable of both good initialization and high-speed initialization.

Figure 9:
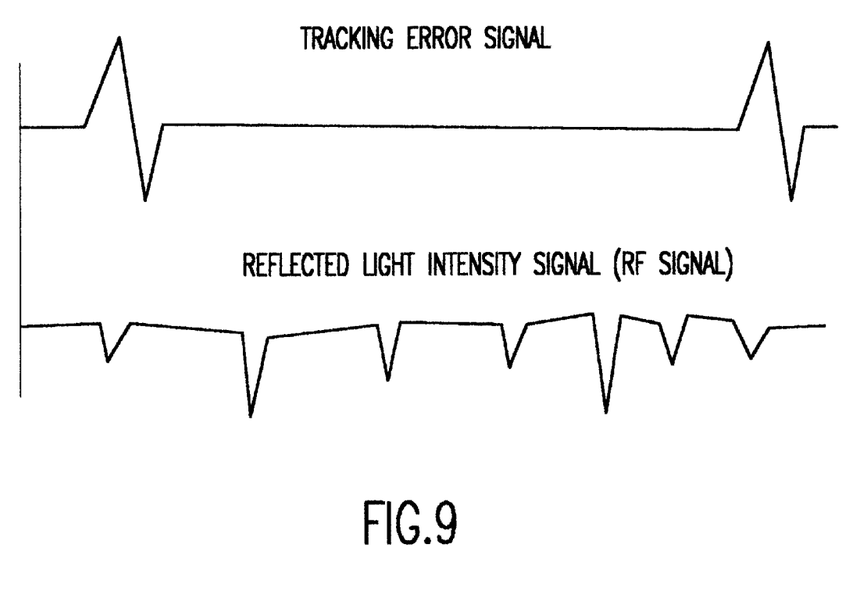
FIG. 9 is a drawing which illustrates the RF signal in the past and track error signal in an example of the initialization method of the past.

FIG. 9 shows the reflected light intensity signal (RF signal) from a phase change disk that has been initialized by the above initialization method. In the above-described method, the RF signal level is not at constant level, as shown in FIG. 9. This is a result of using laser light that is elliptically elongated in the radial direction of the disk to perform a high-speed initialization, this variation in level manifesting itself as variation in initialization. As described above, the power distribution of light from a laser which has been elliptically elongated in the radial direction of disk is not uniform, this manifesting itself as initialization unevenness.

While FIG. 9 shows the example of high-speed initialization using a laser light that has been elliptically elongated in the radial direction of the disk, in the case of fusion initialization, even if a small light spot, having a radius of several micrometers, is used, this type of situation can occur if the servo is unstable.

In view of the above-described drawbacks in the prior art, an object of the present invention is to provide a method for initializing a phase change recording medium at high speed and with good initialization quality, and in doing so alleviate the above-described problems.

SUMMARY OF THE INVENTION

To achieve the above-noted object, the present invention of the first embodiment is a method of initializing a phase change recording medium by radiating laser light of a prescribed power onto the information recording surface to initialize the information recording surface, wherein the power of the laser light is set to a first power which is in the condition of power around at which crystallization is about to occur in the information recording surface, the above-noted laser light being repeatedly radiated onto the part to be initialized.

The present invention of the second embodiment is a method of initializing an information recording surface of a phase change recording medium by radiating laser light of a prescribed power onto the information recording surface to initialize the information recording surface, this method having a first step of setting the power of the laser light to a first power which is in the condition of power around at which crystallization is about to occur in the information recording surface, the radiating of the laser light onto the part to be initialized being done repeatedly, and a second step of setting the power of the laser light to a second power that is greater than the first power, the laser light set to this second power being radiated onto the part to be initialized at least one time.

In the present invention of the first or the second embodiment, the first power is set to a power that is between 1 and 1.3 times the power around at which crystallization is about to occur in the information recording surface.

In the present invention of the second embodiment, the second power is set with a range over which the part to be initialized does not fuse.

In the present invention, when radiating the laser light a plurality of times onto the part to be initialized in the second step, each time the light is radiated the laser light power is gradually made stronger.

Figure 1:
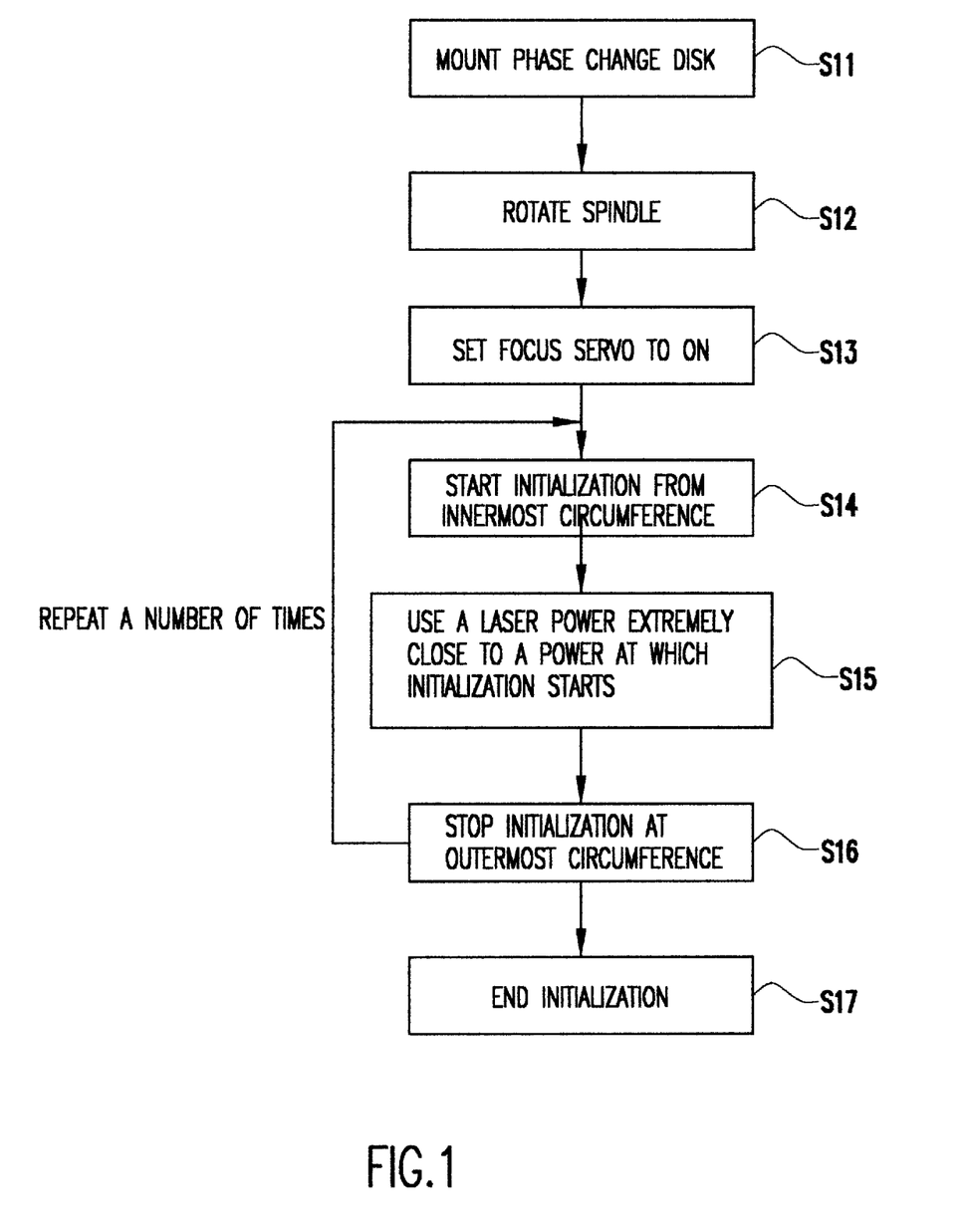
FIG. 1 is a flowchart which corresponds to the first embodiment of the present invention
Figure 4:
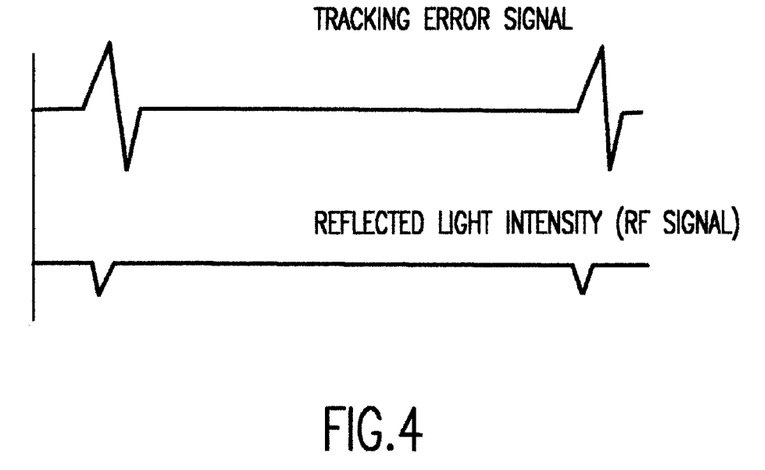
FIG. 4 is a drawing which illustrates the RF signal obtained in the various embodiments.

FIG. 1 is a flowchart which corresponds to the initialization method of the present invention of the first embodiment. Specifically, initialization is performed a plurality of times using a laser power that is extremely close to the power around at which the crystallization (initialization) is about to occur. In this case, the phase change recording film is not raised to a temperature at which it begins to melt, and crystallization proceeds with this layer remaining in as a solid. FIG. 4 shows the reflected light intensity signal (RF signal) in the case of using this initialization method. The RF signal is uniform in comparison with initialization as done in the prior art.

In this method, a laser power in the range of 1.0 to 1.3 times the laser power around at which the crystallization is about to occur is appropriate for use as the laser power extremely near the point at which initialization begins. If initialization is done with a greater power than this, even if the phase change recording film does not fuse, there will be unevenness in the initializations, resulting in an uneven RF signal such as occurs in the initialization method of the past.

Once a uniform RF signal is obtained by this initialization method, even if initialization is done thereafter with a laser power greater than the laser power that is extremely close to that which causes the start of initialization, as long as the recording film does not fuse, unevenness in initialization does not occur.

Figure 5:
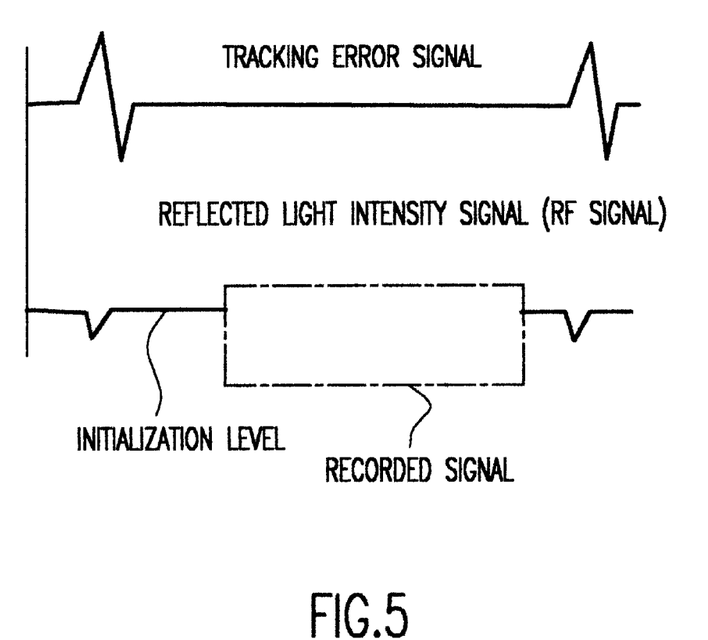
FIG. 5 is a drawing which illustrates the difference in level between the RF signal and the recorded signal in the first and second embodiments of the present invention.

FIG. 5 shows the change in the RF signal when overwriting 10 or more times a part of a phase change recording film that had been initialized by the initialization method of the present invention of the first embodiment. It can be seen that there is a difference between the initialized level (RF signal level after initialization) of a part on which nothing had been recorded and the level of the upper edge part of the recorded signal. This is caused by the small difference in the crystalline structure that is formed by actual overwrite recording and the crystalline structure after initialization. This difference signifies a difference in signal level, and it is desirable that this difference be eliminated in the apparatus.

In such a case, initialization is first performed using a laser power that is very close to the power at which initialization begins and, after obtaining a uniform RF signal such as shown in FIG. 4, initialization is performed again after the laser power is increased without making it so large that the recording film fuses, the RF signal level being gradually increased until it reaches the level of the recording signal upper edge part. By doing this it is possible to obtain a phase change recording medium that has recording and playback characteristics that do not present problems in terms of the apparatus.

DETAILED DESCRIPTION OF THE PREFERRED EMBODIMENTS

Embodiments of present invention are described below, with reference being made to the relevant accompanying drawings.

Figure 6:
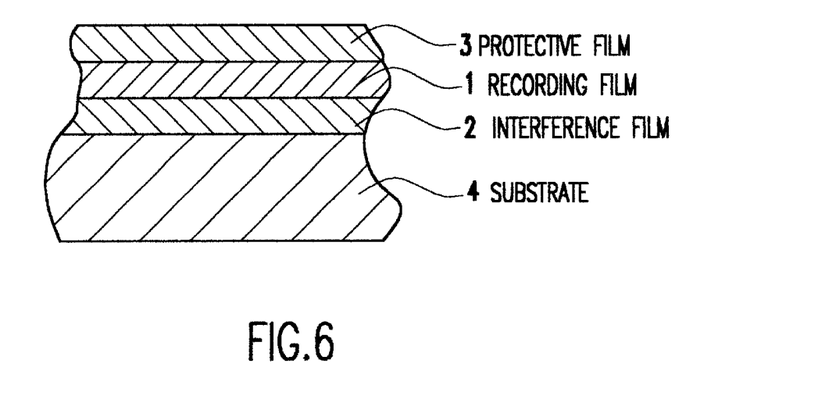
FIG. 6 is a partial cross-sectional view which shows the configuration of a phase change recording medium.

The basic configuration of a phase change recording medium to which an embodiment of the present invention is applied is shown in FIG. 6. In this recording medium, an interference film 2, a recording film 1, and a protective film 3 are laminated in that sequence onto a substrate 4. The interference film 2 and the protective film 3 are dielectric films, between which is sandwiched the recording film 1. Although only the two dielectric films 2 and 3 and the recording film 1 are shown in FIG. 6, it is also possible to have a reflective film or the like formed over the dielectric film protective film) 3 that is disposed over the recording film 1.

A chalcogenide material such as GeSbTe, InSbTe, InSe, InTe, AsTeGe, TeOx-GeSn, TeSeSn, SbSeBi, BiSeGe, AgInsbTe, or the like is used as the material of the recording film1. The use of aluminum or AlTi or the like is desirable as the reflective film. For the substrate 4, it is possible to use a synthetic resin such as polycarbonate or acrylic or the like, or to use glass, and these materials can also be covered with resin. In addition to a disc shape, the substrate can be in the shape of a card.

Figure 7:
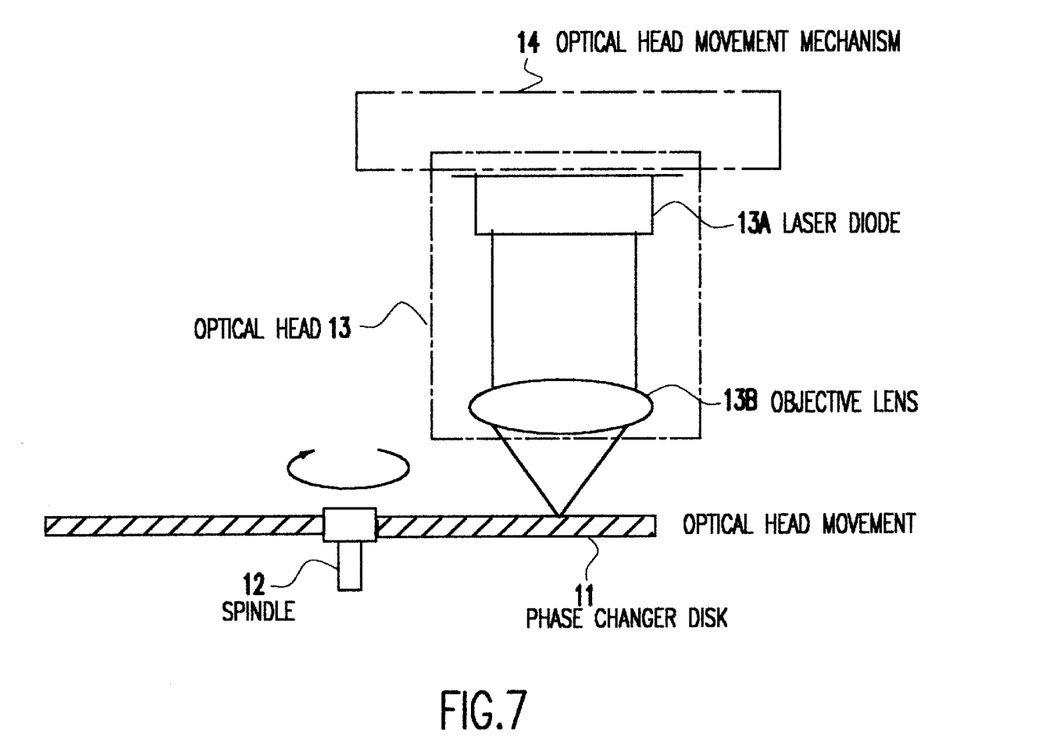
FIG. 7 is a simplified view of the configuration of an initialization apparatus.

Turning to FIG. 7, we see a simplified view of the configuration of the initialization apparatus used with the present invention.

A phase change recording disk 11 is fixed to a spindle 12, so as to rotate in concert with the rotation of the spindle 12. An optical head 13 moves along the radial direction of the disk in accordance with operation of an optical disk movement mechanism 14. The optical disk 13 has a laser diode 13$a$ which is capable of having its laser light power adjusted, the light from this laser diode 13$a$ passing through an objective lens 13$b$ so as to be collected onto the recording film1. The objective lens 13$b$ also has a focus servo (not shown in the drawing). Each of the above-noted elements is operated under the control of a controller (not shown in the drawing).

Next, the essence of the present invention will be described by presenting detailed examples of embodiments thereof.

In this embodiment, a polycarbonate disk having a substrate thickness of 0.6 mm, a track pitch of 0.56 $\mu$m, and a diameter of 120 mm is used as the substrate 4. A ZnS-SiO$_2$ with a thickness of 160 nm as an interference film 2, a $Ge_2Sb_2Te_5$ film with a thickness of 10 nm as a recording film 1, and a $ZnS-SiO_2$ film with a thickness of 32 nm as a protective film are laminated in that sequence onto this substrate 4. Additionally in this embodiment, a AiTi film with a thickness of 80 nm is further formed on top of the protective film 3.

The light spot diameter of the initialization apparatus is approximately 2 μm in the tangential direction of the disk, and approximately 100 μm in the radial direction of the disk. In this case, the laser power around at which the initialization (crystallization) of the phase change recording medium was about to occur was 350 mW. The disk rpm was set to result in a linear velocity 7.5 m/s at each radius. Additionally, the optical head was moved 5 μm for each rotation of the disk. Under these conditions, initialization by the method of the present invention was performed on the above-noted phase change recording medium.

The first embodiment of the present invention will be described with reference being made to FIG. 1. First, initialization was performed 10 times with a laser power of 370 mW (steps S14 through S16). This number of times, 10, means that the light spot passes by a given location on the disk 10 times. By doing this, a good RF signal such as shown in FIG. 4 was obtained.

Figure 2:
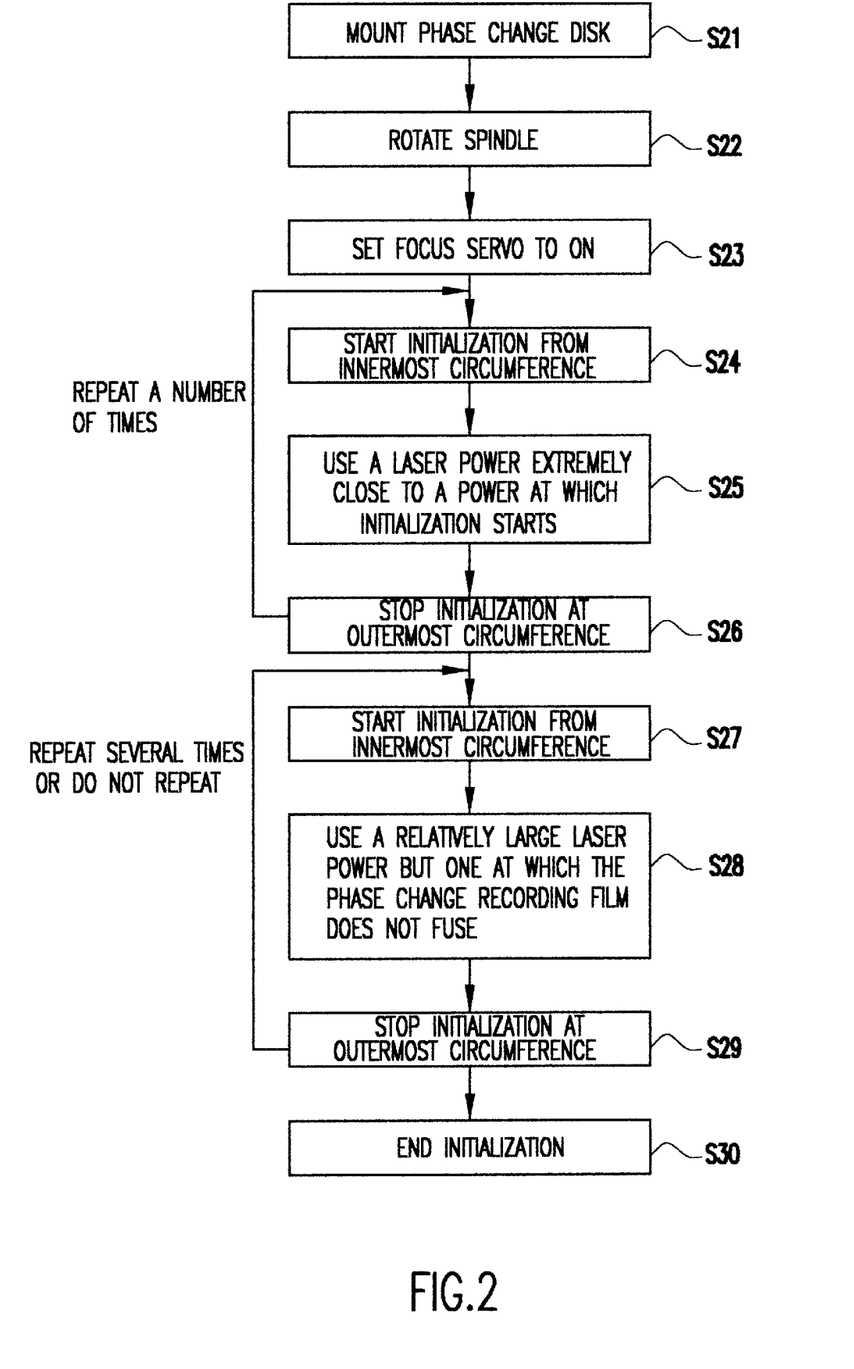
FIG. 2 is a flowchart which corresponds to the second embodiment of the present invention.

The second embodiment of the present invention will be described with reference being made to FIG. 2. Initialization was performed 3 times with a laser power of 370 mW (steps S24 through S26), after which initialization was performed 1 time with a power of 500 mm (steps S27 through S29). This type of initialization also resulted in a good RF signal such as shown in FIG. 4. However, the RF signal was slightly larger than the above-noted case of initializing 10 times with a laser power of 370 mW.

Figure 3:
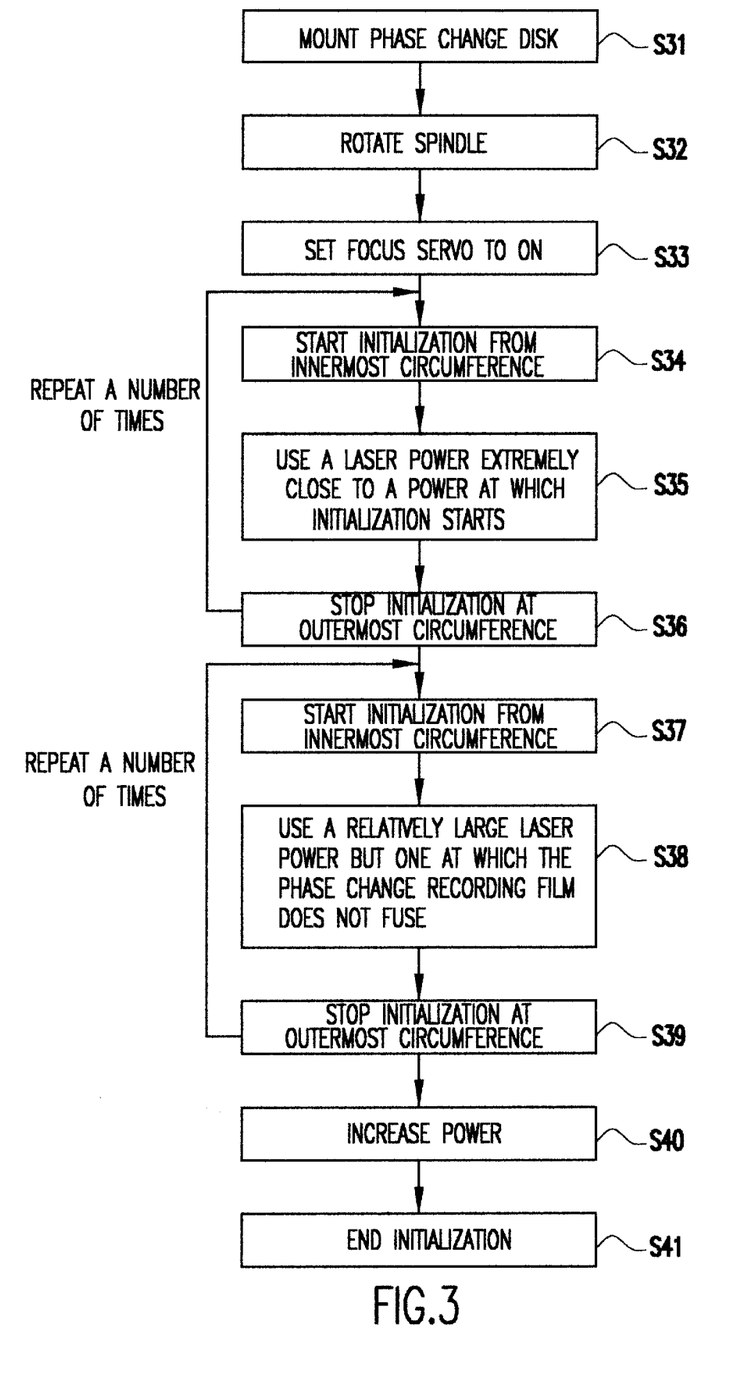
FIG. 3 is a flowchart which corresponds to the third embodiment of the present invention.

The third embodiment of the present invention will be described with reference being made to FIG. 3. In this embodiment, initialization was performed 3 times with a laser power of 370 mW (steps S34 through S36), after which initialization was performed as the laser power was stepped up gradually through the sequence 400 mW, 450 mW, 500 mW, and finally 550 mW (steps S37 through S40). In this case as well, a good RF signal such as shown in FIG. 4 was obtained.

After initialization, recording was performed over the part that had been initialized. The level at the top edge part of the part that was overwritten 10 times ox more was almost equal to the initialized level. This is means that it was possible to obtain good characteristics which was extremely easy to use.

Upon performing an initialization over the entire surface of a 120-mm disk using the methods described in the foregoing embodiments, the time required was found to be approximately 20 minutes. Considering the case in which, initialization using a light spot having an approximate radius of several micrometers (by an initialization method which obtains a relatively uniform RF signal) requires several hours, it can be seen that the present invention enables initialization at an extremely high speed.

By way of comparison, the phase change recording medium fabricated as described herein was initialized one time with a laser power of 460 mg. In this case, tee uneven RF signal shown in FIG. 9 was obtained, this type of RF signal being impractical for actual use. In the phase change recording medium fabricated as described herein, it was known from calculations and the like that at this power there would not be fusion. That is, it can be seen that even if there is no fusion, if a high laser power is used from the beginning, it is not possible to obtain a good RF signal.

Additionally, the phase change recording medium fabricated as described herein was initialized one time with a laser power of 600 mW. In this case as well, an uneven RF signal such as shown in FIG. 9 was obtained. In this case, the phase change recording film is in the fused condition at one time (fusion initialization), and in this case as well it is not possible to achieve good initialization.

By virtue of the technical constitution of the present invention as described in detail above, whereby the method of initialization is that of repeatedly radiating onto the information recording surface laser light having a power that is very close to the power around at which crystallization thereof is about to occur, it is possible to perform good initialization at high speed, this presenting great possibilities in terms of high-density, mass-produced phase change recording media, and the present invention representing a superior method of initializing a phase change recording medium that was heretofore not available.

What is claimed is:

1. A method of initializing a phase change recording medium, comprising:

repeatedly radiating laser light onto a recording layer of said recording medium, said radiating step including:
radiating the laser light at a first power only; and then
radiating the laser light at a second power greater than said first power onto said recording power, said first power corresponding to a condition around which crystallization is about to occur in said recording layer of said recording medium.

2. A method of initializing an information recording surface of a phase change recording medium according to claim 1, wherein said first laser power is set so as to be between 1 and 1.3 times a power around at which crystallization is about to occur in the recording layer of said information recording surface.

3. A method of initializing a phase change recording medium according to claim 1, wherein said laser light has a circular cross-section.

4. A method of initializing a phase change recording medium according to claim 1, further comprising:

after said step of radiating said laser light at said second power, radiating the recording layer with said laser light at gradually increasing powers.

5. A method of initializing a phase change recording medium according to claim 4, said first power is 370 mW, said second power is 400 mW, and said gradually increasing powers includes at least one of 450 mW, 500 mW, and 550 mW.

6. A method of initializing an information recording surface of a phase change recording medium by radiating laser light onto a recording layer of said information recording surface, said method comprising:

a first step of setting power of said laser light to a first power which corresponds to around where crystallization is about to occur in said recording layer, and then repeatedly radiating said laser light at said first power only; and a second step of setting power of said laser light to at least a second power that is greater than said first power, and then radiating said laser light at said second power at least one time onto said recording layer after said first step.

7. A method of initializing an information recording surface of a phase change recording medium according to claim 6, wherein said second power is set within a range over which said part to be initialized does not fuse.

8. A method of initializing an information recording surface of a phase change recording medium according to claim 6, wherein when radiating said laser onto said part to be initialized in said second step a plurality of times, each time said laser light is radiated the power thereof is gradually increased.

9. A method of initializing an information recording surface of a phase change recording medium according to claim 6, wherein said first laser power is between 1 and 1.3 times a power around which crystallization is about to occur in said recording layer.

10. A method of initializing a phase change recording medium, comprising:

repeatedly radiating laser light onto a recording layer of said phase change recording medium, said radiating step including:

radiating the laser light at a first power; and then radiating the laser light at a second power greater than said first power onto said recording layer, said first power corresponding to a condition around which crystallization is about to occur in said recording layer of said recording medium and said second power corresponding to a power which does not cause said recording layer to melt.

11. A method of initializing a phase change recording medium according to claim 10, wherein said first laser power is set between 1 and 1.3 times a power which produces crystallization occurs in said phase change recording medium.

12. A method of initializing a phase change recording medium according to claim 10, wherein said laser light has a circular cross-section.

13. A method of initializing a phase change recording medium according to claim 10, fixer comprising:

after said step of radiating said laser light at said second power, radiating the recording layer with said laser light at gradually increasing powers.

\* \* \* \* \*